(12) United States Patent
Ohtomo et al.

(10) Patent No.: US 6,396,571 B2
(45) Date of Patent: May 28, 2002

(54) PORTABLE TYPE DISTANCE MEASURING APPARATUS

(75) Inventors: Fumio Ohtomo; Masahiro Ohishi, both of Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 09/883,637

(22) Filed: Jun. 18, 2001

(30) Foreign Application Priority Data

Jul. 24, 2000 (JP) .................................... 2000-222351

(51) Int. Cl.$^7$ ................................................ G01C 3/08
(52) U.S. Cl. ......................................... 356/5.1; 356/4.01
(58) Field of Search ................................. 356/3.01, 5.15

(56) References Cited

U.S. PATENT DOCUMENTS

| | | | | |
|---|---|---|---|---|
| 3,865,491 A | * | 2/1975 | Hogan | 356/152 |
| 4,136,955 A | * | 1/1979 | Aeschlimann et al. | 356/152 |
| 4,681,433 A | * | 7/1987 | Aeschlimann | 356/5 |
| 4,820,041 A | * | 4/1989 | Davidson et al. | 356/1 |
| 4,825,091 A | * | 4/1989 | Breyer et al. | 250/560 |
| 5,767,952 A | * | 6/1998 | Ohtomo et al. | 356/4.01 |
| 5,815,251 A | | 9/1998 | Ehbets | 356/5.01 |
| 6,023,326 A | * | 2/2000 | Katayama et al. | 356/141.3 |
| 6,219,133 B1 | * | 4/2001 | Kawase et al. | 356/139.04 |

* cited by examiner

*Primary Examiner*—Thomas H. Tarcza
*Assistant Examiner*—Brian K Andrea
(74) *Attorney, Agent, or Firm*—Nields & Lemack

(57) ABSTRACT

A portable type distance measuring apparatus which comprises an apparatus main body 11 having a distance measuring unit for measuring a distance by projecting a distance measuring light 30, a control unit for controlling the distance measuring unit and for processing measurement data from the distance measuring unit and a transmitting unit to emit a communication light including the measurement data to a distance measuring direction, and a target unit having a display unit 13, an operation unit 14 and a photodetection unit 15 for receiving the communication light, wherein the target unit is removably mounted on the apparatus main body so that the target unit may be used as an object to be measured for distance measurement when necessary.

10 Claims, 6 Drawing Sheets

PORTABLE TYPE DISTANCE MEASURING APPARATUS

BACKGROUND OF THE INVENTION

The present invention relates to a portable type distance measuring apparatus, by which survey operation can be performed in easier manner.

In recent years, portable type distance measuring apparatuses with light wave distance measuring functions have been brought to the commercial stage. The portable type distance measuring apparatuses have been known and used in the past. However, the portable type distance measuring apparatus with the light wave distance measuring function is a high-performance distance measuring system using a reflecting prism as a target object, and it may not be adequate to simply name it as a portable type distance measuring apparatus. Also, a portable type distance measuring apparatus using an ultrasonic wave has been known, but it is low in accuracy and narrow in a range of which distance measurement can be performed, and performance characteristics are not high enough for the actual execution of survey operation.

The portable type distance measuring apparatus with the light wave distance measuring function has been produced recently for practical use. This apparatus uses a light of electro magnetic wave type and enable to measure a distance up to the target object with high accuracy using pulse number and phase of pulsed light. For the measurement of short distance (up to about 100 m), it is used as a non-prism type without using a reflecting prism as the target object. When the reflecting prism is used, distance measurement can be achieved for a long distance.

Referring to FIG. 7, description will be given below on a conventional portable type distance measuring apparatus.

A portable type distance measuring apparatus 1 is designed in such size and shape that it can be handled and carried by one hand. It is a portable type distance measuring apparatus of non-prism type without using a reflecting prism.

The portable type distance measuring apparatus 1 comprises a distance measuring unit (not shown), an azimuth finder, and a power source unit such as battery incorporated in it. A distance measuring light from the distance measuring unit is projected from a projection unit 2 provided on one surface of the portable type distance measuring apparatus 1. On upper surface of the portable type distance measuring apparatus 1, a display unit 3 and an operation unit 4 are arranged. The operation unit 4 has various types of pushbuttons such as a power switch, an operation switch, etc. By operating these pushbuttons, a distance measuring light 6 is projected from the projection unit 2 to a measurement plane 5 of a target object. As the distance measuring light 6, a visible light is used. An operator can visually confirm a projected position of the distance measuring light 6 on the measurement plane 5. The distance measuring light 6 reflected by the measurement plane 5 enters the distance measuring unit via the projection unit 2. By the distance measuring unit, a distance between the portable type distance measuring apparatus 1 and the measurement plane 5 (target object) is measured, and the result of measurement is displayed on the display unit 3.

The conventional portable type distance measuring apparatus as described above is a light wave distance measuring instrument and can measure the distance to the target object and the measurement plane with high accuracy. To provide portability, it is designed as a non-prism type. The light wave distance measuring instrument is used to measure a distance by receiving a reflection light from the measurement plane (target object), and it is used on the assumption that the measurement plane is present. In case the measurement plane is present at a position opposite to the portable type distance measuring apparatus, measurement can be made effectively. In case there is no target object, it is not possible to determine a position apart from the portable type distance measuring apparatus 1 by a given distance. Also, it is not possible to determine positions with a given spacing along the projecting direction of the distance measuring light.

Further, in case the measurement plane is a plane tilted with respect to the distance measuring light or ground surface, there are much variations on the measured values according to the properties of the surface to be projected. That is because, among the regions projected by the distance measuring light, an area with higher reflection is selected as a measuring point.

SUMMARY OF THE INVENTION

It is an object of the present invention to provide a portable type distance measuring apparatus, which can be used as a distance measuring system of a non-prism type in case there is a target object suitable for measurement, and which can be used as a distance measuring system of a prism type in case there is no target object suitable for measurement.

To attain the above object, the portable type distance measuring apparatus according to the present invention comprises an apparatus main body having a distance measuring unit for measuring a distance by projecting a distance measuring light, a control unit for controlling the distance measuring unit and for processing measurement data from the distance measuring unit and a transmitting unit to emit a communication light including the measurement data to a distance measuring direction, and a target unit having a display unit, an operation unit and a photodetection unit for receiving the communication light, wherein the target unit is removably mounted on the apparatus main body so that the target unit may be used as an object to be measured for distance measurement when necessary. Also, the present invention provides a portable type distance measuring apparatus as described above, wherein the apparatus main body further comprises a display unit and an operation unit, and the apparatus main body can be operated under condition that the target unit is separated. Further, the present invention provides a portable type distance measuring apparatus as described above, wherein each of the apparatus main body and the target unit comprises a power source unit and a control unit so that the apparatus main body and the target unit can be operated independently. Also, the present invention provides a portable type distance measuring apparatus as described above, wherein the distance measuring light also serves as the communication light, the transmitting unit comprises a modulation circuit for polymerizing the measurement data to the distance measuring light, and the target unit comprises a demodulation circuit for separating and extracting the measurement data from the distance measuring light. Further, the present invention provides a portable type distance measuring apparatus as describe above, wherein at least one of the apparatus main body and the target unit is provided with an arithmetic operation program for obtaining survey results as desired based on the distance measurement data. Also, the present invention provides a portable type distance measuring apparatus as described above, wherein the apparatus main body and the target unit are integrated with each other, and the distance measurement data is delivered and received between the apparatus main body and the target unit by the distance measuring light. Further, the present invention provides a portable type distance measuring apparatus as described above, wherein the distance measuring light is a visible light and has a pointer function. Also, the present invention provides a portable type distance measuring apparatus as described above, wherein a visible laser pointer beam is projected to a direction opposite to a projecting direction of the distance measuring light. Further, the present invention provides a portable type distance measuring apparatus as describe above, wherein a bubble tube for detecting horizontality of the distance measuring light is provided on the apparatus main body. Also, the present invention provides a portable type distance measuring apparatus as described above, wherein the bubble tube is an electric bubble tube for detecting inclination, and a tilt angle is displayed on the display unit based on an output corresponding to the inclination.

DETAILED DESCRIPTION OF THE PREFERRED EMBODIMENT

Figure 1:
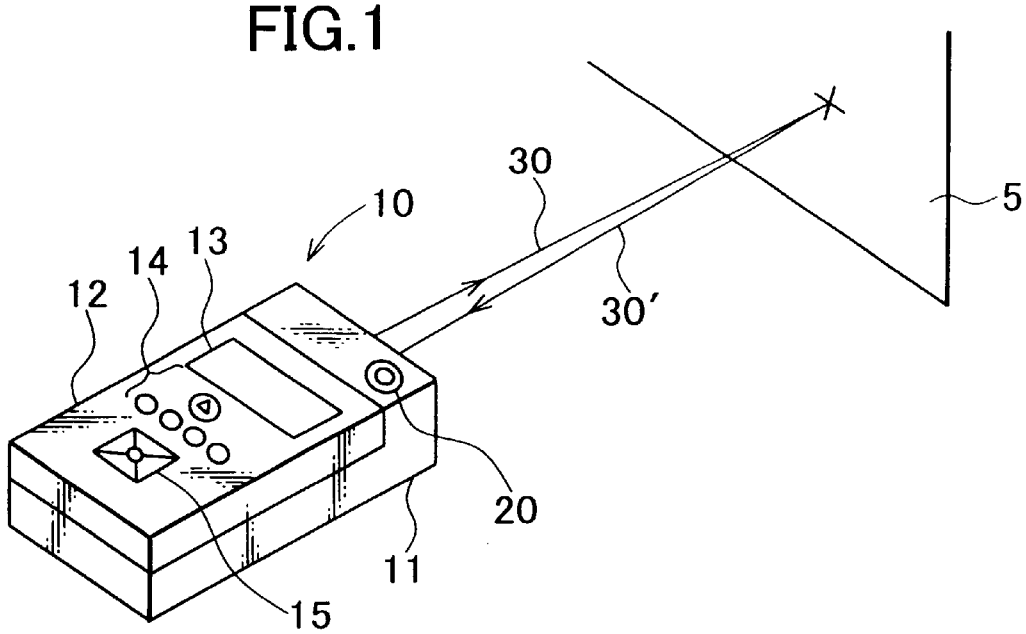
FIG. 1 is a perspective view of an embodiment of the present invention where an apparatus main body and a target unit are integrated.

Description will be given below on embodiments of the present invention referring to the drawings.

Figure 2:
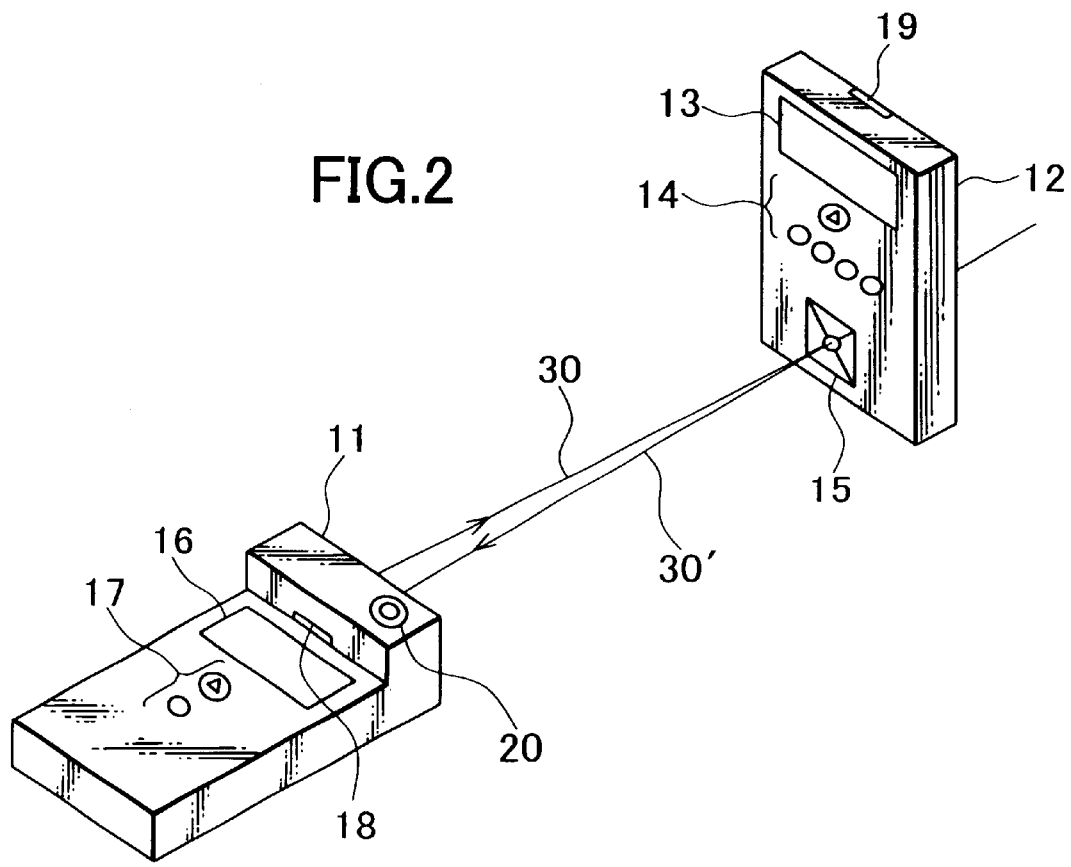
FIG. 2 is a perspective view of an embodiment of the present invention where an apparatus main body and a target unit are separated from each other.

As shown in FIG. 1 and FIG. 2, a portable type distance measuring apparatus 10 comprises an apparatus main body 11 and a target unit 12. The target unit 12 is removably mounted on the apparatus main body 11. The apparatus main body 11 and the target unit 12 can be handled and carried by one hand regardless of whether these are separated from each other or integrated, and these are designed in such size and shape as to be easily handled and carried. When these component units are integrated, the apparatus main body 11 and the target unit 12 are electrically connected with each other.

Now, description will be given on the apparatus main body 11 and the target unit 12.

The target unit 12 comprises a target display unit 13, a target operation unit 14, and a photodetection unit 15 which also serves as a reflection unit. It is designed as a self-standing type with the photodetection unit 15 directed toward the apparatus main body 11.

On a mounting surface of the apparatus main body 11 where the target unit 12 is to be mounted, there are provided a main body display unit 16 and a main body operation unit 17. On the main body operation unit 17, operation buttons are arranged at lower level than the mounting surface so that no trouble occurs when the target unit 12 is mounted on it. On the target unit 12 and the apparatus main body 11, connector units 18 and 19 are disposed respectively to connect them with each other when the target unit 12 is mounted. On a portion of the apparatus main body 11 other than the portion where the target unit 12 is mounted, an electric bubble tube 20 is disposed, and a tilt detected by the electric bubble tube 20 is displayed on the target display unit 13 or the main body display unit 16. As the electric bubble tube, a bubble tube of capacitance type or of resistance type may be used. As a tilt detector other than the electric bubble tube, a mechanical detector of pendulum type may be used.

Figure 3:
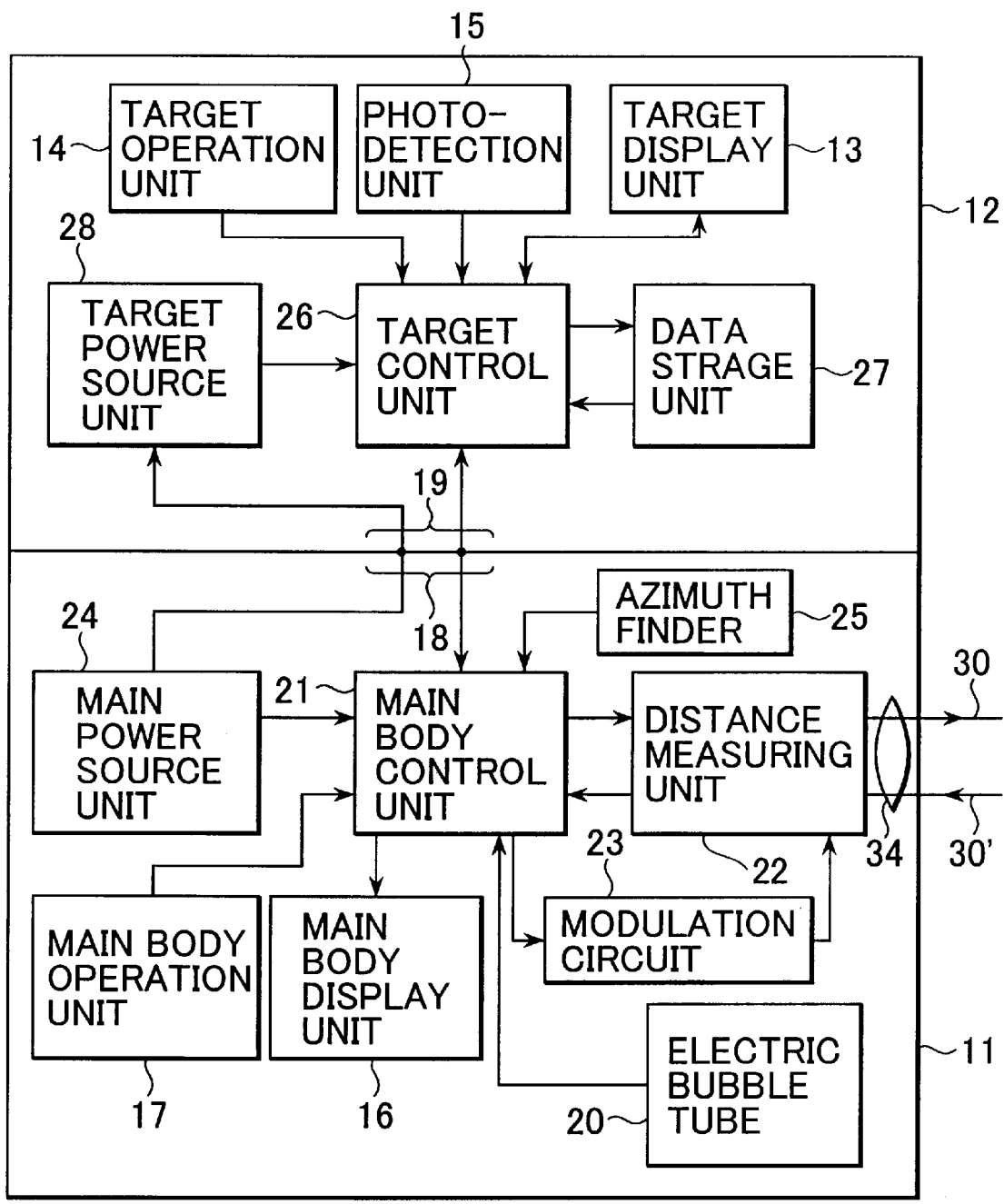
FIG. 3 is a block diagram of the embodiment of the present invention as given above.

Further, description will be given below referring to FIG. 3.

The apparatus main body 11 mainly comprises a main body control unit 21, a distance measuring unit 22, a modulation circuit 23, a main power source unit 24, the main body display unit 16, the main body operation unit 17 and the electric bubble tube 20 as described above, and an azimuth finder 25. The main body control unit 21 incorporates a sequence program for light wave measurement in it. The distance measuring unit 22 is driven and controlled by the main body control unit 21. The modulation circuit 23 is driven and controlled by the main body control unit 21, modulates a distance measuring light 30, and polymerizes communication data to the distance measuring light 30.

The target unit 12 primarily comprises a target control unit 26 connected to the main body control unit 21 via the connector units 18 and 19, a data storage unit 27 connected to the target control unit 26 and used for storing distance measurement data, a target power source unit 28 connected to the main power source unit 24 via the connector units 18 and 19 and charged by the main power source unit 24, the target display unit 13, the target operation unit 14 and the photodetection unit 15 as described above. In the target control unit 26, a survey program is incorporated for calculating a distance between two points based on distance measurement data or for calculating an area of predetermined range based on the distance measurement data and an azimuth angle. The storage unit 27 may be provided on the apparatus main body 11, or the survey program may be incorporated in the main body control unit 21. Both the apparatus main body 11 and the target unit 12 may be provided with the storage unit and the survey program.

As the distance measuring light 30 projected from the distance measuring unit 22, a visible laser beam with high visibility is used, which enable to measure a long distance and has a pointer function.

In the following, description will be given on operation.

First, description will be given on measurement in case there is the measurement plane 5 suitable for measurement as shown in FIG. 1.

In case there is the measurement plane 5 suitable for measurement, the apparatus main body 11 and the target unit 12 are integrated with each other, and the distance is measured by a non-prism type.

A horizontality is confirmed by the electric bubble tube 20 mounted on the apparatus main body 11. When the apparatus main body 11 is set at a horizontal position, the distance measuring light 30 is also set at a horizontal position. That is, a horizontal distance to a target object, i.e. the measurement plane 5, is measured.

When a tilt is known, a tilted distance can be converted to the horizontal distance. The tilt of the apparatus main body 11 is detected by using the electric bubble tube 20 as the bubble tube, from which a tilt angle is electrically outputted, and the tilt angle is displayed on the display unit. Based on the displayed value, the horizontal distance is calculated. Further, it is easy and possible to incorporate an arithmetic operation program and to convert the tilted distance to the horizontal distance by a single switching operation.

A power switch is turned on by the target operation unit 14, and measurement is started by operating a measurement starting button, and other necessary operating procedures are carried out.

An instruction of an operator inputted from the target operation unit 14 is inputted to the main body control unit 21 via the target control unit 26 and the connector units 18 and 19. The main body control unit 21 issues a measurement command to the distance measuring unit 22.

The distance measuring unit 22 is driven by the measurement command from the main body control unit 21, and the distance measuring light 30 is irradiated. A reflected distance measuring light 30' reflected from the measurement plane 5 is received, and light wave distance measurement is performed. The distance measurement data is inputted to the main body control unit 21. The main body control unit 21 inputs the distance measurement data and the azimuth angle detected by the azimuth finder 25 to the target control unit 26 via the connector units 18 and 19.

The target control unit 26 controls the data storage unit 27 to store the distance measurement data from the main body control unit 21, and measurement result is displayed on the target display unit 13.

In case measurement is performed on a plurality of points, the results of measurement are sequentially stored in the data storage unit 27. When measurement operation for all points has been completed during the measurement operation, it is possible to call the data at any desired time and to display it on the target display unit 13. Displays of the data are performed with orders of measurement and the azimuth angle, and differentiation is made for each measuring point. Based on the incorporated survey program, the target control unit 26 calculates an area of a surveyed range from the measurement data and the azimuth angles at the plurality of points.

Next, in case there is no measurement plane 5 suitable for measurement, or in case of long distance measurement, the target unit 12 is separated from the apparatus main body 11 as shown in FIG. 2, and it is used as a target.

Under the condition where the target unit 12 is separated, operation can be performed from the main body operation unit 17 and the target operation unit 14 respectively. Therefore, both two-man operation and one-man operation can be achieved.

In case of one-man operation, the power is turned on from the main body operation unit 17. The main body control unit 21 displays the result of detection from the azimuth finder 25 on the main body display unit 16. The operator determines measurement azimuth and installs the apparatus main body 11 so that it is at the determined azimuth. Then, the main body operation unit 17 is operated, and the distance measuring light 30 is projected from the distance measuring unit 22, and measurement is started. Under the condition where the target unit 12 is separated, the modulation circuit 23 is operated. By modulating the distance measuring light 30, the distance measurement results and the survey data such as the azimuth angle are polymerized to the distance measuring light 30 as communication data.

The operator moves under the condition where the distance measuring light 30 is projected to the photodetection unit 15, and installs the target unit 12 at a measuring point. The photodetection unit 15 reflects the distance measuring light 30 to the apparatus main body 11. The apparatus main body 11 receives the reflection light from the photodetection unit 15, and the distance measuring unit 22 measures a distance between the apparatus main body 11 and the target unit 12. The result of distance measurement is inputted to the main body control unit 21. The main body control unit 21 performs modulation control of the modulation circuit 23 based on the distance measurement data. According to a control command from the main body control unit 21, the modulation circuit 23 polymerizes the distance measurement data to the distance measuring light 30 as communication data. Peripheral region of the photodetection unit 15 is designed as a plane, which easily reflects the light toward the apparatus main body 11. For instance, the region is made of a material which has a retroreflection property to some extent.

The photodetection unit 15 receives the distance measuring light 30, converts it to a photodetection signal and inputs it to the target control unit 26. The target control unit 26 separates and extracts the communication data from the photodetection signal. The communication data thus separated and extracted is stored in the data storage unit 27 as a distance measurement data. When a measurement at one point is completed, the target unit 12 is moved, and measurements are repeatedly performed along a straight line using the distance measuring light 30 as a guide light. Results of the measurements are stored in the data storage unit 27 together with orders of the measurements.

In case it is wanted to perform positioning at a predetermined spacing, spacing length should be set to the target control unit 26 from the target operation unit 14. Then, the target control unit 26 compares the measurement result with the preset spacing length and calculates. Then, lamps (not shown) are lighted up each at the predetermined spacing, or movement at the predetermined spacing length is displayed on the target display unit 13.

In case a measuring point is determined by the target unit 12, an index formed by cutting, etc. is set at a position which serves as a reference for the target unit 12 in order to mark the measuring point. In order that the operator can easily recognize, the target display unit 13 may be provided on opposite side of the photodetection unit 15 or on top surface of the target unit 12 when it is erected. As the power source, a rechargeable type, or a dry cell type, or both may be used.

Figure 4:
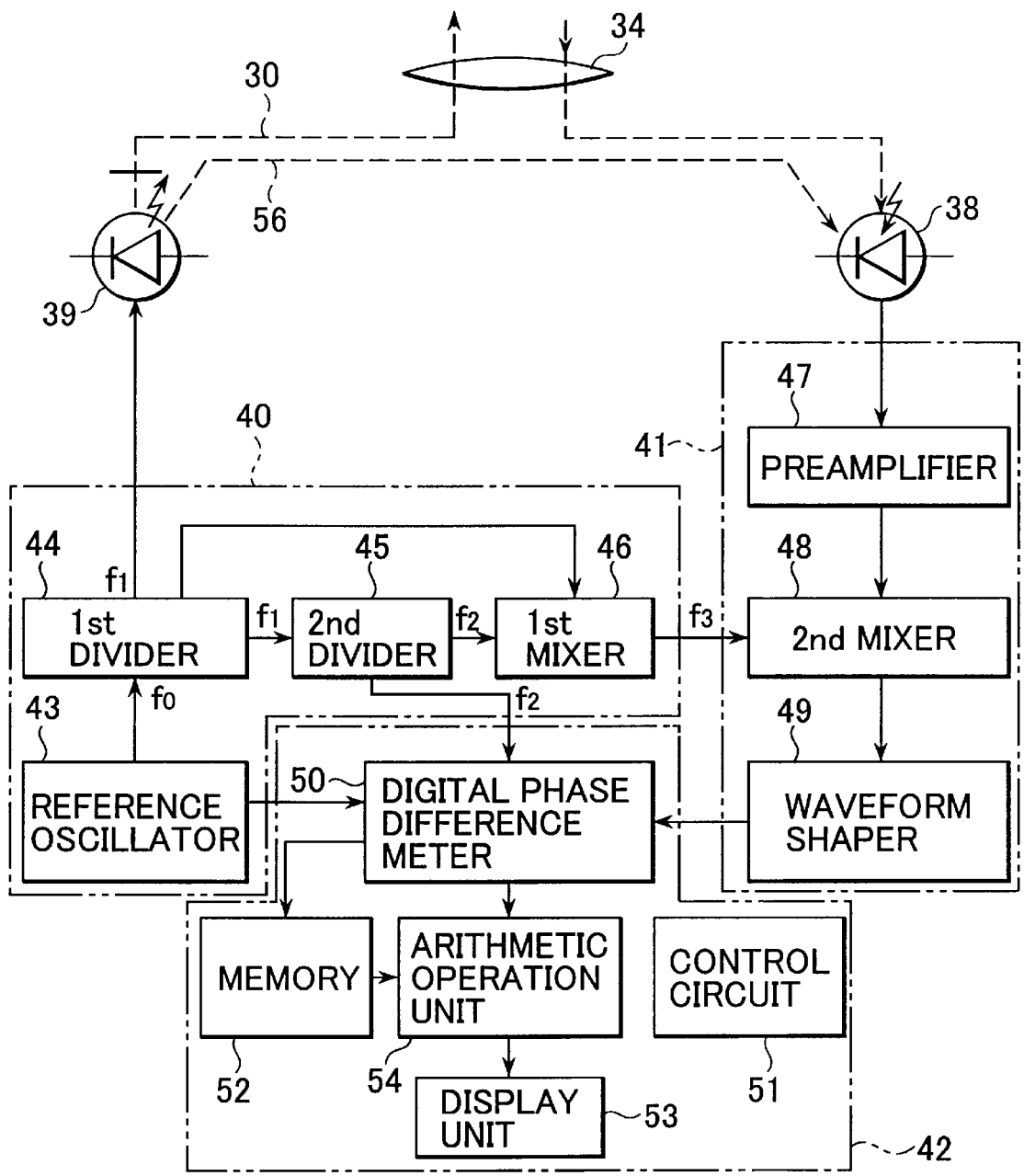
FIG. 4 is a distance measuring circuit diagram of a light wave distance measuring instrument used in the embodiment.

Next, referring to FIG. 4, description will be given on an example of the distance measuring unit 22 for performing distance measurement. As non-prism distance measurement mode, there are a pulse mode and a phase difference mode of a continuous light. In case of a visible light, the latter is generally used. Description will be given below on the phase difference mode.

A light wave distance measuring instrument comprises a light emitting side analog circuit 40, a light receiving side analog circuit 41, and a digital circuit 42. The light emitting side analog circuit 40 comprises a reference oscillator 43, a first divider 44 for being inputted from the reference oscillator 43 and for outputting to a light emitting element 39, a second divider 45 for being inputted from the first divider 44, and a first mixer 46 for being inputted from the first divider 44 and the second divider 45. The light receiving side analog circuit 41 comprises a preamplifier 47 for being inputted from a photodetection element 38, a second mixer 48 for being inputted from the preamplifier 47 and the first mixer 46, and a waveform shaper 49 for being inputted from the second mixer 48 and for outputting to the digital circuit 42.

The digital circuit 42 comprises a digital phase difference meter 50 inputted from the reference oscillator 43, the second divider 45, and the waveform shaper 49, a memory 52 inputted from the digital phase difference meter 50, and an arithmetic operation unit 54 inputted from the digital phase difference meter 50 and the memory 52 and for outputting to a display unit 53. The digital circuit 42 further comprises a control circuit 51. In the arrangement as described above, it is desirable that the light receiving side analog circuit 41 and the light emitting side analog circuit 40 are independently shielded. When it is necessary to have higher accuracy, it is desirable to shield all of the blocks shown in FIG. 4.

In the electrical circuit as described above, reference frequency f0=30 MHz is divided to 1/20 by the first divider 44, and a signal with frequency of f1=1.5 MHz is issued. This signal is sent to the light emitting element 39, and the light emitting element 39 emits an infrared modulation light with frequency of 1.5 MHz. The modulated light from the light emitting element 39 is selectively turned to an internal reference light 56 or the distance measuring light 30. The distance measuring light 30 is sent to an object to be measured (not shown) disposed at a target point via an objective lens 34. It is then reflected and reaches the photodetection element 38 via the objective lens 34 again. A light beam entering the photodetection element 38 contains a light component of 1.5 MHz and a light component with phase difference corresponding to the distance.

On the other hand, the signal with frequency f1 from the first divider 44 is also supplied to the second divider 45, and it is divided to 1/500, and a signal with frequency of f2=3 kHz is issued. This signal is supplied to the first mixer 46, and a signal with frequency of 1497 MHz, which is obtained by f3÷f1−f2=1497 MHz, is produced, i.e., a difference from the signal with frequency of f1 from the first divider 44. This signal with frequency f3 is further supplied to the second mixer 48 of the light receiving side analog circuit 41. The second mixer 48 produces a beatdown signal from the signal with frequency f3 and the output signal supplied from the preamplifier 47, i.e. f1−f3=f2.

Because the signal from the photodetection element 38 has a phase difference component corresponding to the distance, the output signal of the second mixer 48 has the signal with frequency f2=3 kHz and a phase difference corresponding to the distance. This signal is shaped by the waveform shaper 49 and is sent to the digital phase difference meter 50 at the digital circuit 42. The signal with frequency f2 from the second divider 45 is sent to the digital phase difference meter 50 as a reference signal and the digital phase difference meter 50 detects the phase difference corresponding to the distance. The size of the detected phase difference is digitally measured according to a signal with frequency f0 from the reference oscillator 43, and this value is supplied to the arithmetic operation unit 54. The arithmetic operation unit 54 calculates the distance to the object to be measured based on the distance measurement data and calculates a distance between two points, an area of a predetermined range, etc., based on distance measurement data at two points.

Figure 5:
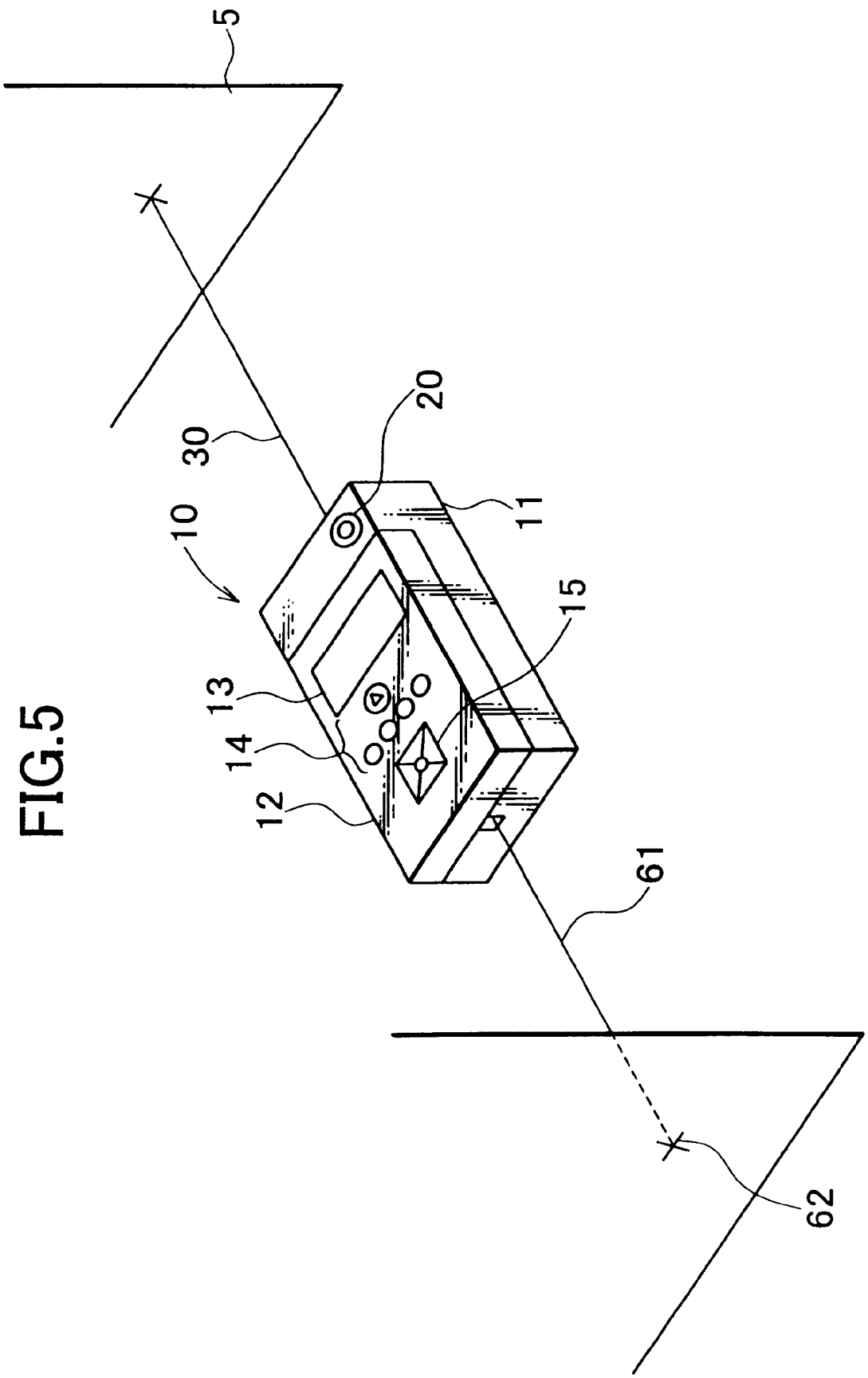
FIG. 5 is a perspective view of another embodiment of the present invention.

Referring to FIG. 5, description will be given on the case where the apparatus main body 11 has a rear pointer function.

The apparatus main body 11 is designed to project a rear laser pointer beam 61 from a rear end surface, and the rear laser pointer beam 61 is on the same straight line as the distance measuring light 30 which is projected in a front direction. The rear laser pointer beam projected in a backward direction is a visible laser beam. The rear laser pointer beam 61 is used to align with a reference point 62 at a rear position. When the rear position is determined, the measuring direction is also determined, and this further facilitates the measurement operation using the target unit 12.

Figure 6:
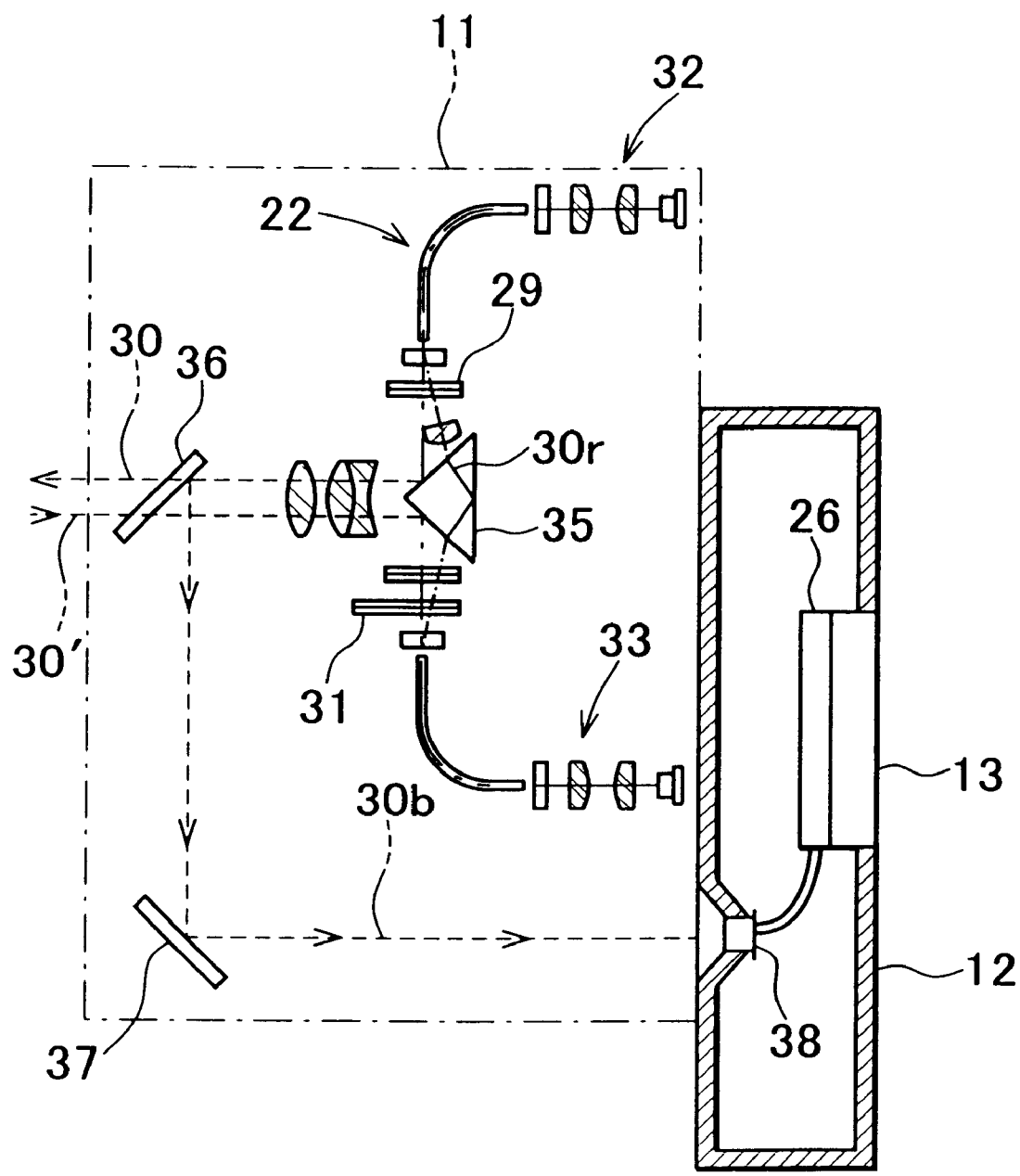
FIG. 6 represents still another embodiment of the present invention, showing a case where signals are delivered and received between the apparatus main body and the target unit by means of a part of a distance measuring light.
Figure 7:
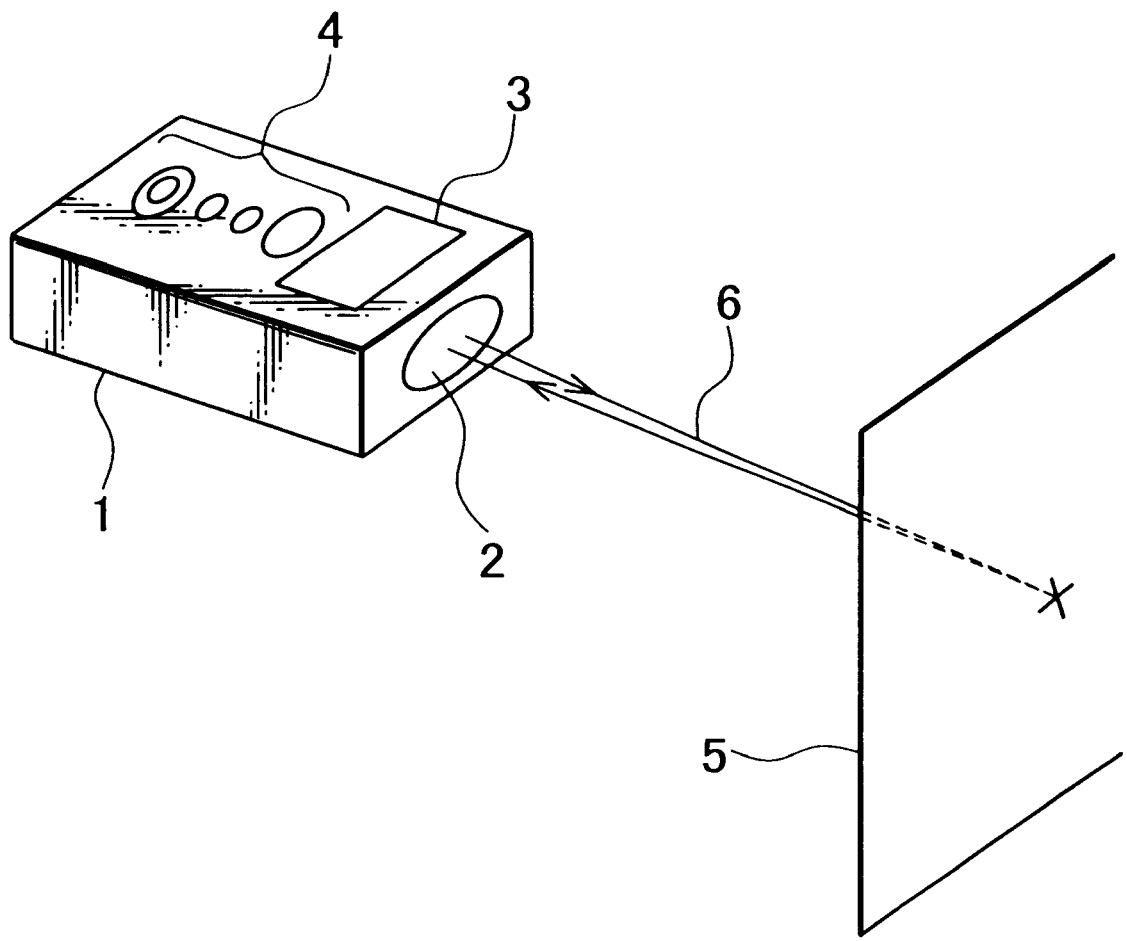
FIG. 7 is a perspective view of a conventional system.

FIG. 6 shows another embodiment of the present invention. In this embodiment, even when the apparatus main body 11 is integrated with the target unit 12, signals are given and received between these two units via optical communication.

In the above embodiment, there is no need to use the connector units 18 and 19, which serve as routes for the signals, and this contributes to the simplification of the structure.

More concrete description will be given below.

In FIG. 6, the distance measuring unit 22 in the apparatus main body 11 is shown in detail.

In the figure, reference numeral 32 denotes a distance measuring light emitting unit, and a driver (not shown; see the light emitting side analog circuit 40 in FIG. 4) of the distance measuring light emitting unit 32 is modulated by the modulation circuit 23.

The modulated distance measuring light is selectively divided to an internal reference light 30r and the distance measuring light 30 by a chopper 29. The distance measuring light 30 is projected to a target object via a prism 35 and a half-mirror 36. The internal reference light 30r passes through the prism 35 and a density filter 31 and enters a distance measuring light receiving unit 33. A part of the distance measuring light 30 is split by the half-mirror 36, and the split light 30b enters the photodetection element 38 of the photodetection unit 15 via the mirror 37. From the photodetection element 38, a photodetection signal is inputted to the target control unit 26.

A reflected distance measuring light 30' projected from the apparatus main body 11 and reflected by the target object enters the apparatus main body 11 again. It is further reflected by the prism 35 and enters the distance measuring light receiving unit 33. The density filter 31 turns light amount of the internal reference light 30r and the reflected distance measuring light 30' to a constant level, and these beams enter the distance measuring light receiving unit 33. Based on the reflected distance measuring light 30' entering the distance measuring light receiving unit 33 and on the internal reference light 30r, light wave distance measurement is performed. The result of measurement is polymerized to the distance measuring light 30 by the modulation circuit 23 as communication data.

Distance measurement data is polymerized to the split light 30b, and the target control unit 26 separates and extracts the distance measurement data from the photodetection signal from the photodetection element 38. The distance measurement data thus separated and extracted is displayed on the target display unit 13 or it is stored in the data storage unit 27.

The communication between the apparatus main body 11 and the target unit 12 may be radio communication instead of optical communication. Or, another optical communication means for optical communication may be provided, which uses a different light from the distance measuring light.

According to the present invention, distance measurement can be achieved in a non-prism mode. Even when there is no suitable target object and distance measurement in a non-prism mode is difficult to perform, the target unit can be used as the target object. Thus, distance can be measured regardless of measuring environment. Because the target unit is provided with a reflection unit, reflection can be achieved with high efficiency. Distance measurement for a long distance can be performed. Using a distance measuring light as a guide light, a measuring point can be set as desired, or measuring points can be set with a given spacing.

What is claimed is:

1. A portable type distance measuring apparatus which comprises a apparatus main body having a distance measuring unit for measuring a distance by projecting a distance measuring light, a control unit for controlling said distance measuring unit and for processing measurement data from said distance measuring unit and a transmitting unit to emit a communication light including the measurement data to a distance measuring direction, and a target unit having a display unit, an operation unit and a photodetection unit for receiving the communication light, wherein said target unit is removably mounted on said apparatus main body so that said target unit may be used as an object to be measured for distance measurement when necessary.

2. A portable type distance measuring apparatus according to claim 1, wherein said apparatus main body further comprises a display unit and an operation unit, and said apparatus main body can be operated under condition that said target unit is separated.

3. A portable type distance measuring apparatus according to claim 1, wherein each of said apparatus main body and said target unit comprises a power source unit and a control unit so that said apparatus main body and said target unit can be operated independently.

4. A portable type distance measuring apparatus according to claim 1, wherein the distance measuring light also serves as the communication light, said transmitting unit comprises a modulation circuit for polymerizing the measurement data to the distance measuring light, and said target unit comprises a demodulation circuit for separating and extracting the measurement data from the distance measuring light.

5. A portable type distance measuring apparatus according to claim 1, wherein at least one of said apparatus main body and said target unit is provided with an arithmetic operation program for obtaining survey results as desired based on the distance measurement data.

6. A portable type distance measuring apparatus according to claim 1, wherein said apparatus main body and said target unit are integrated with each other, and the distance measurement data is delivered and received between said apparatus main body and said target unit by the distance measuring light.

7. A portable type distance measuring apparatus according to claim 1, wherein the distance measuring light is a visible light and has a pointer function.

8. A portable type distance measuring apparatus according to claim 1, wherein a visible laser pointer beam is projected to a direction opposite to a projecting direction of the distance measuring light.

9. A portable type distance measuring apparatus according to claim 1, wherein a bubble tube for detecting horizontality of the distance measuring light is provided on said apparatus main body.

10. A portable type distance measuring apparatus according to claim 9, wherein said bubble tube is an electric bubble tube for detecting inclination, and a tilt angle is displayed on said display unit based on an output corresponding to the inclination.

* * * * *